July 1, 1969     S. M. FAIRCHILD ET AL     3,452,528
CARRIER APPARATUS FOR FRUIT PICKERS

SHERMAN M. FAIRCHILD
CLIFTON M. JONES
INVENTORS

BY Lyon+Lyon
ATTORNEYS

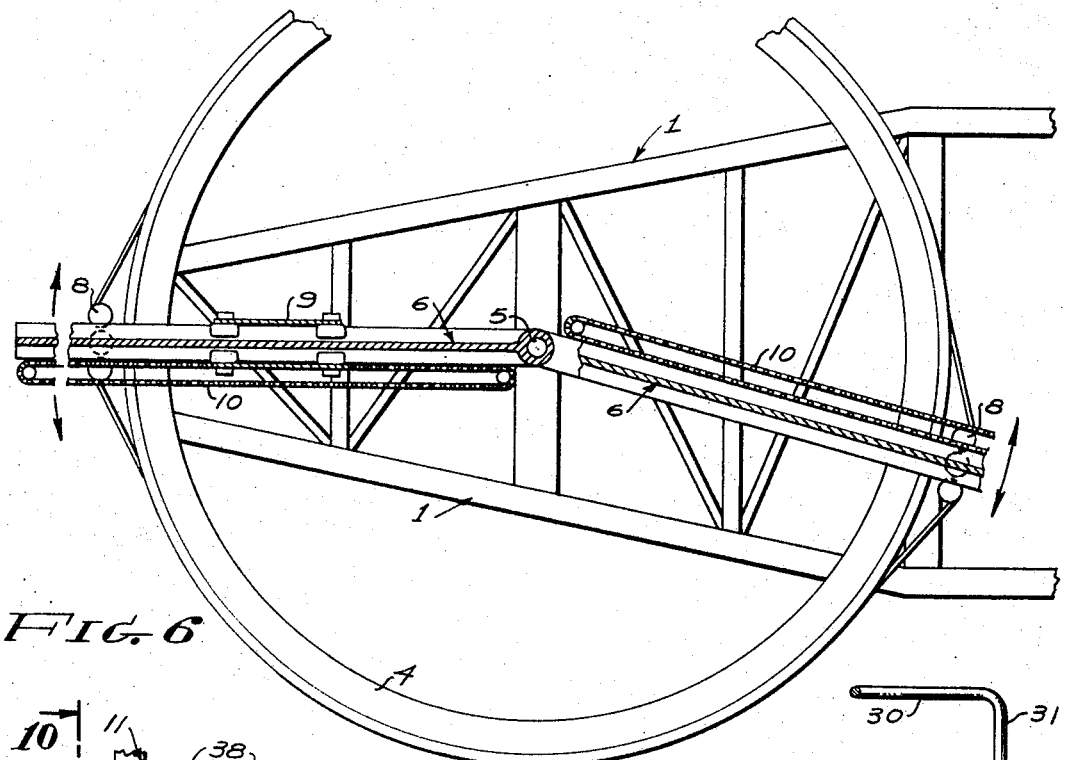
FIG. 6
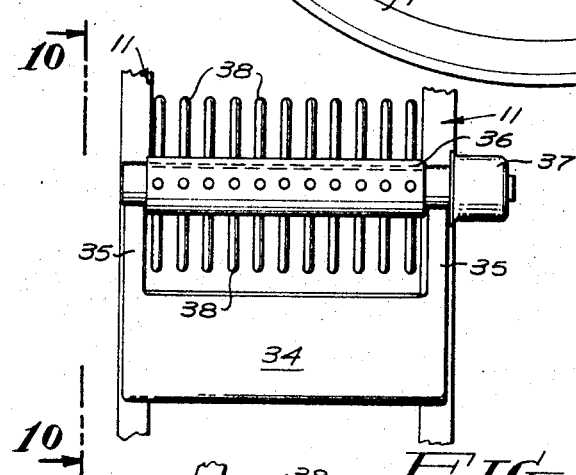
FIG. 9
FIG. 8
FIG. 7
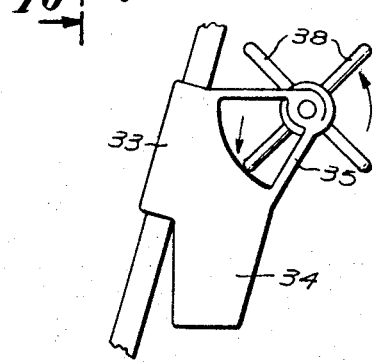
FIG. 10
SHERMAN M. FAIRCHILD
CLIFTON F. JONES
INVENTORS
ATTORNEYS

United States Patent Office

3,452,528
Patented July 1, 1969

3,452,528
CARRIER APPARATUS FOR FRUIT PICKERS
Sherman Mills Fairchild, New York, N.Y., and Clifton M. Jones, Santa Monica, Calif., assignors to Fruit Harvester Corporation, Los Angeles, Calif., a corporation of Delaware
Filed July 6, 1966, Ser. No. 565,649
Int. Cl. A01g 19/00
U.S. Cl. 56—328                                10 Claims

ABSTRACT OF THE DISCLOSURE

A carrier apparatus for fruit pickers in which one or more buckets, each adapted to support a fruit picker, is supported for vertical movement on a vertical track, which, in turn, is supported from a radial track, suspended from a circular track that is positioned essentially centrally over a tree from a wheeled structure capable of movement between rows of trees, with the result that a fruit picker may move around a tree radially with respect to the tree and vertically with respect to the tree.

*Summary of the invention*

This invention relates to carrier apparatus for fruit pickers; that is to apparatus for supporting and maneuvering a fruit picker around a fruit tree and from the bottom to the top thereof.

Included in the objects of this invention are:

First, to provide a carrier apparatus which includes a carrier in the form of a basket or bucket, adapted to receive a person in an upright position, and maneuvering mechanism capable of moving the carrier circumferentially about a tree as well as raising or lowering the carrier or moving the carrier radially with respect to the tree so that all parts of the tree are made accessible.

Second, to provide a carrier apparatus for fruit pickers which includes a circular track, adapted to be placed in approximately centered relation to a tree, the track being equipped with one or more radial tracks capable of rotation about the axis of the circular track, each radial track supporting an essentially vertical track, on which is mounted a carrier dimensioned to support a fruit picker in an upright position.

Third, to provide a carrier apparatus which incorporates a novel bucket in which a fruit picker may stand with his arms free to pick fruit, and which is tiltable by the fruit picker to increase the effective reach of the fruit picker, the basket being sufficiently small that it may be forced into the tree a limited distance without appreciable damage to the limbs of the tree.

Fourth, to provide a carrier apparatus which, while primarily intended to move a person so that all parts of the tree are accessible, may be arranged to support and move a fruit picking machine in a similar manner.

Fifth, to provide a carrier apparatus wherein most of the apparatus employed to maneuver a person with respect to the tree, may be utilized to maneuver a fruit picking machine.

Sixth, to provide a carrier apparatus which incorporates means for lifting the lower branches of the tree so as to make the fruit thereon accessible to a fruit picker standing on the ground, the carrier apparatus being used in its normal manner to enable the fruit picker to reach the fruit located higher in the tree.

With the above and other objects in view, as may appear hereinafter, reference is directed to the accompanying drawings in which:

FIGURE 6 is a fragmentary sectional view taken through 6—6 of FIGURE 2 showing the supporting structure from its underside.

FIGURE 7 is a fragmentary view of the fruit picker's bucket or basket and its supporting frame and showing further an attachment for lifting the lower branches of a tree.

FIGURE 8 is a sectional view through 8—8 of FIGURE 7 showing the lifting frame.

FIGURE 9 is a fragmentary view of a pair of vertical tracks, as viewed from the radially innerside thereof, the tracks being arranged to support a fruit picking machine.

FIGURE 10 is a fragmentary side view thereof.

*Specification*

Figure 1:
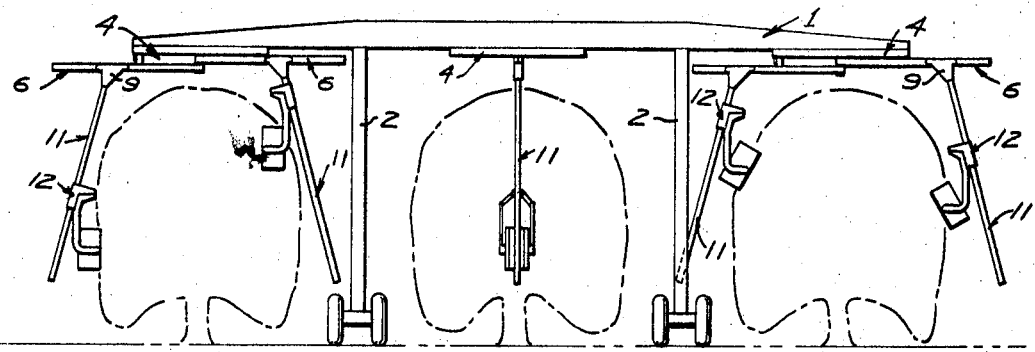
FIGURE 1 is a substantially diagrammatical view, showing a row of three trees with the carrier apparatus for fruit pickers shown in various typical positions with respect to the fruit tree.

The carrier apparatus is intended to service a single fruit tree. Several carrier apparatus are supported from a main frame structure 1, which as illustrated in FIGURE 1, extends over three fruit trees, but may extend over four or more, and may extend over more than one row of fruit trees. The main frame structure is supported on vertical posts 2, having tractor units 3 at their lower ends, which move in the space provided between adjacent fruit trees.

Each carrier apparatus includes a ring track 4, supported underneath the main frame structure 1. Each ring track is adapted to be located in concentric relation with the vertical axis of a tree. Centered with respect to the ring track 4, is a pivot means 5, suspended from the main frame structure.

The pivot means 5 journals the radially inner end of one or more radial tracks 6. Each radial track is supported intermediate its ends from the ring track 4 by a carriage 7, adapted to follow a circular path determined by the ring track. A suitable drive means 8 is provided so that circular movement of each radial track about the pivot means 5 may be controlled. For purposes of illustration, the drive means 8 includes a cable or chain wrapped around the ring track 4 and a suitable gear motor unit mounted above the radial track. If two radial tracks are provided, one is located above the other so that each radial track is free to move almost a full circle without interference with the other track.

Each radial track supports a radially movable carriage 9 which is operated by a drive means 10. For purposes of illustration, the drive means 10 is shown as comprising a gear motor and a chain, the chain being attached to the carriage 9.

Figure 5:
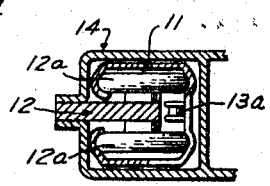
FIGURE 5 is an enlarged transverse sectional view, taken through 5—5 of FIGURE 2.

Depending from each carriage 9 is an essentially vertical track 11, similar to the radial tracks 6. Each vertical track is channel shaped in cross section as indicated in FIGURE 5, and guides a carriage 12 having rollers 12a which ride in the track. The carriage is operated by a drive means which, for purposes of illustration, includes a gear motor and chain similar to the drive means 10, except that the chain is confined within the channel shaped track 11 and the return reach 13a is disposed between the rollers.

It should be noted that each of the drive means per se, may be considered as conventional and while illustrated as including electric motor drives, may comprise reciprocable or rotatable hydraulic drives.

Each vertical movable carriage 12 is provided with a radially inwardly directed suspension arm 14 from which is suspended a bucket or basket frame 15. Each frame 15 includes a pair of vertical arms 16, the upper ends of which converge and extend laterally to form hanger arms 17 which are connected to each other and to the suspension arm 14 by conventional pivot means having a vertical axis of rotation.

The lower extremities of the vertical arms 16 are joined to lower horizontal arms 17 which extend on opposite sides of a bucket or basket 18 and joined thereto by pivotal connections 19. The bucket 18 is centered under the vertical axis of rotation of the frame 15. The bucket 18 is approximately square in plan and includes a curved front wall 20, parallel side walls 21, and a floor 22. The remaining or rear side of the bucket is provided with an access opening 23. The floor of the bucket is spaced a sufficient distance from the hanger arms 17, that a man may stand upright in the bucket.

The axis of connection between the lower horizontal arms 17 and the bucket is preferably located near the forward or radially inward side of the bucket and intermediate the upper and lower end thereof.

Figure 2:
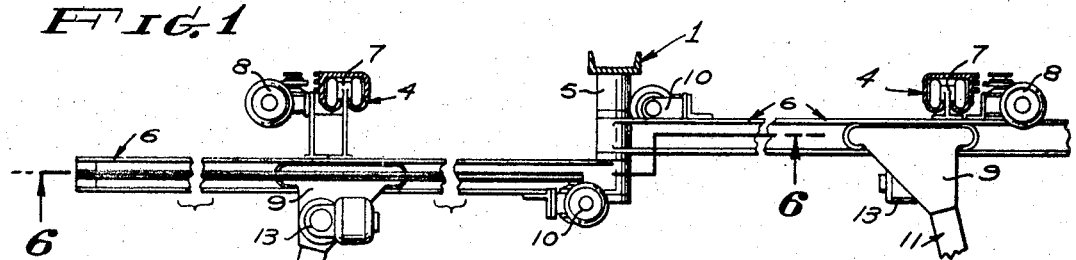
FIGURE 2 is an enlarged fragmentary view of one of the carrier assemblies intended to service a friut tree with the supporting structure shown in section.
Figure 3:
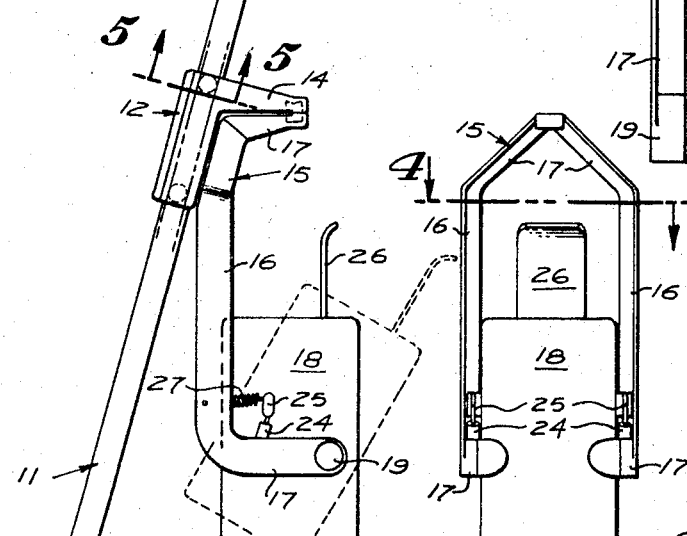
FIGURE 3 is a side view of the basket or bucket in which the fruit picker rides, together with its supporting frame.
Figure 4:
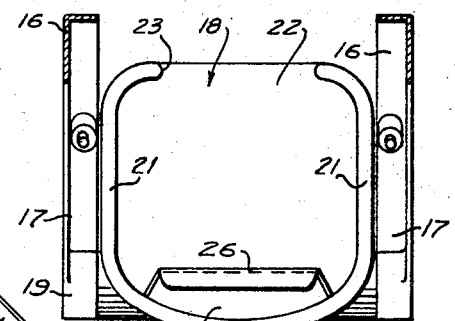
FIGURE 4 is an enlarged transverse sectional view, taken through 4—4 of FIGURE 3.

In order to prevent rotation in a counterclockwise direction, as viewed in FIGURE 2, the lower horizontal arms 17 are connected to the basket or bucket 18 by shock absorbers 24, appropriate connecting lugs 25 being provided on the bucket as shown best in FIGURE 2. Springs 27 also extend between the vertical arms 16 and the connecting lugs 25. The springs urge the bucket in a counterclockwise direction, as viewed in FIGURE 2. However, by leaning forward or radially inward, the worker may tilt the bucket in a clockwise direction, as indicated by dotted lines in FIGURE 2.

Near the forward wall of the bucket, there is provided an upstanding apron 26 which extends in front of the chest of the worker so that the worker may lean against the apron and extend his arms around the sides thereof. Between the apron and the bucket, there is formed a fruit receiving space 28 which communicates with a fruit sack or other suitable container, not shown but positioned in front of the worker.

Operation of the carrier apparatus for fruit pickers is as follows:

The main frame structure 1 is capable of manipulation so that a carrier apparatus may be centrally located over each of several trees to be serviced simultaneously. This is preferably done after the fruit which is readily accessible from the ground has been picked. It is preferred that two workmen be employed to pick the fruit of each tree. After the readily accessible fruit has been picked the workmen enter the buckets 18 at ground level. Located in each bucket are suitable control means not shown which control the carriages 7, 9, and 12. Movement of the carriage enables the workmen to move circumferentially with respect to the tree, to move radially inward and outward, and to move vertically. The workmen may therefore readily follow the contour of the tree and reach into the branches to pick the fruit.

It will be noted that the dimensions of the radially inner side of the bucket confronting the tree need not be much larger than the workmen so that the bucket may be pressed into the outer portions of the tree to enable the workmen to gather the less accessible fruit. Also by reason of the tiltable connection between the bucket 18 and the frame 15, the workmen may lean forward between the branches of the tree to gather the less accessible fruit. The tilting movement of the bucket is particularly advantageous in picking fruit located in the crown of the tree.

The pivotal connection which affords rotation of the bucket 18 about a vertical axis, permits the access opening 23 to be turned so as to clear the vertical track 11, so that the workmen may readily enter or leave the bucket when the bucket is at or near ground level.

While it is contemplated that movement of the bucket be under the control of the worker, it should be noted that movement of the bucket may be programmed in its movement, thus relieving the worker of the task of manipulating the bucket.

Reference is now directed to FIGURES 7 and 8. Some types of fruit trees, for example citrus fruit trees, often have lower branches which dip to or almost to the ground. Normally this requires tiring stoop labor in order to harvest the fruit close to the ground. In order to minimize this labor, each bucket frame 15 may be provided with a lift frame 29, having side bars 30 and a cross bar 31. The lift frame is removably supported by guides 32 provided in or below the lower horizontal arms 17. The lift frame 29 extends radially inward from the bucket 18 and its side arms are offset so that the extended portion of the lift frame may be lowered to ground level, then manipulated under one or more branches and raised so that the branches, and the fruit thereon, are brought to a more convenient level for harvesting.

Reference is now directed to FIGURES 9 and 10. The carrier apparatus may be adapted to the operation of mechanical fruit pickers. For this purpose, a pair of tracks 6 may be arranged in parallel relation for pivotal movement about a common pivot means 5, so that a pair of vertical tracks 11 are located in parallel relation as indicated in FIGURE 9.

In place of the carriage 12, a pair of vertically movable carriages 33 are provided. The carriages 33 may be similar to the carriages 12, but are joined together by a suitable basket structure 34. The ends of the basket structure are provided with brackets 35 which journaled therebetween the drum 36, overlying the open upper end of the basket structure. The drum 36 is rotated by a suitable drive means 37. The drum is provided with a plurality of radially extending fruit picking fingers 38, which are rotated in a counter clockwise direction as viewed in FIGURE 10.

The mechanical fruit picker is manipulated so that the fingers extend between the branches and leaves, and engage the fruit so as to pluck the fruit from the tree and deliver the fruit to the basket structure 34. The mechanical fruit picker, per se, is not part of the present invention. Its disclosure is intended for the purpose of illustrating a manner in which the carrier apparatus may be adapted to mechanical fruit picking as distinguished from manual fruit picking.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:
1. A carrier apparatus for fruit pickers, comprising:
 (a) a frame structure adapted to be positioned over a tree;
 (b) at least one radial track supported by said frame structure above said tree for rotation about a vertical axis in approximately centered relation to said tree;
 (c) a radially movable carriage supported by track;
 (d) an essentially vertical track suspended from said carriage for circular movement about said tree;
 (e) and a vertically movable fruit picker supporting carriage guided by said vertical track.

2. A carrier apparatus for fruit pickers according to claim 1, wherein:
 (a) said fruit picker supporting carriage includes a horizontal arm;
 (b) a second frame is rotatably supported by said arm about a vertical axis;

(c) and a workman carrying basket is supported by said frame.

3. A carrier apparatus for fruit pickers according to claim 2, wherein:
(a) said basket is pivotally connected to said frame for tilting movement about a horizontal axis in response to change in location of the center-of-gravity of said workman;
(b) and spring means tends to maintain said basket in an upright position.

4. A carrier apparatus for fruit pickers according to claim 1, wherein:
(a) said vertical carriage supports a fruit picking machine.

5. A carrier apparatus for fruit pickers according to claim 2, wherein:
(a) a branch lifting means is removably connected to said second frame.

6. A carrier apparatus for fruit pickers according to claim 1, wherein:
(a) a circular track is supported by said frame in concentric relation to the axis of rotation of said radial track;
(b) and a carriage is movable in said circular track and attached to said radial track intermediate its ends.

7. A carrier apparatus for fruit pickers, comprising:
(a) a mobile frame structure extending over a plurality of trees;
(b) a plurality of circular tracks carried by said frame structure and so positioned as to place one ring track in concentric relation above each fruit tree;
(c) at least one carriage arranged to circle said circular track;
(d) a radial track supported by said carriage for circular movement about the center of said track and said tree;
(e) a carriage, movable radially on said radial track;
(f) a downwardly inclined track suspended from said radially movable carriage;
(g) a carriage vertically movable on said inclined track;
(h) a fruit picker supporting carrier suspended from said vertically movable carriage;
(i) and means for operating said carriages to move said carrier, circumferentially, radially and vertically with respect to a tree.

8. A carrier apparatus according to claim 7, wherein:
(a) said fruit picker carrier is a vertically oriented basket for supporting a workman in a vertical position.

9. A carrier apparatus according to claim 8, wherein:
(a) said fruit picker carrier is tiltable about a horizontal axis upon the workman leaning outwardly from the carrier.

10. A carirer apparatus according to claim 7, wherein:
(a) said fruit picker carrier is suspended between a pair of vertically movable carriages supported by a pair of vertical tracks.

References Cited

UNITED STATES PATENTS

| | | | |
|---|---|---|---|
| 1,974,572 | 9/1934 | Laflin | 56—329 |
| 2,674,500 | 4/1954 | Hukari | 56—328 |
| 2,953,229 | 9/1960 | Wiegel | 56—328 |
| 3,127,725 | 4/1964 | Richardson | 56—328 |
| 3,272,282 | 9/1966 | Sanders | 182—141 X |
| 3,203,503 | 8/1965 | Smith et al. | 182—2 |

ABRAHAM G. STONE, Primary Examiner.

P. A. RAZZANO, Assistant Examiner.

U.S. Cl. X.R.

182—37, 141